United States Patent
Milkereit et al.

(10) Patent No.: US 7,663,971 B2
(45) Date of Patent: Feb. 16, 2010

(54) RESONANCE SCATTERING SEISMIC METHOD

(76) Inventors: Bernd Milkereit, 26 Geneva Avenue, Toronto, Ontario M5A 2J8 (CA); Thomas Bohlen, Wilchelm-Stabe Strasse 52a, Wattenbek 24582 (DE)

( * ) Notice: Subject to any disclaimer, the term of this patent is extended or adjusted under 35 U.S.C. 154(b) by 159 days.

(21) Appl. No.: 10/973,086

(22) Filed: Oct. 25, 2004

(65) Prior Publication Data
US 2005/0162974 A1 Jul. 28, 2005

Related U.S. Application Data

(60) Provisional application No. 60/514,134, filed on Oct. 24, 2003.

(51) Int. Cl.
*G01V 1/28* (2006.01)
*G01V 1/30* (2006.01)
(52) U.S. Cl. ............................................ 367/47; 367/57
(58) Field of Classification Search .................. 367/38, 367/40, 47, 57; 702/11, 17
See application file for complete search history.

(56) References Cited

U.S. PATENT DOCUMENTS

| | | | |
|---|---|---|---|
| 4,249,422 A | 2/1981 | Gaunaurd et al. | |
| 4,691,306 A | 9/1987 | Arens et al. | |
| 4,864,545 A | 9/1989 | Gras et al. | |
| 5,157,392 A * | 10/1992 | Zimmer | 340/853.9 |
| 5,173,880 A * | 12/1992 | Duren et al. | 367/38 |
| 5,892,732 A | 4/1999 | Gersztenkorn | |
| 6,009,043 A * | 12/1999 | Chon et al. | 367/57 |
| 6,128,577 A | 10/2000 | Assa et al. | |
| 6,748,330 B2 * | 6/2004 | Leaney | 367/57 |
| 6,807,489 B2 * | 10/2004 | Naville et al. | 702/17 |
| 2004/0122596 A1 * | 6/2004 | Sudhakar et al. | 702/17 |
| 2005/0010366 A1 * | 1/2005 | Castagna et al. | 702/14 |

OTHER PUBLICATIONS

Wu, et al. "Scattering charactistics of elastic waves by an elastic heterogeneity." Geophysics, vol. 50 (Apr. 1985).*

(Continued)

*Primary Examiner*—Scott A Hughes
(74) *Attorney, Agent, or Firm*—Ogilvy Renault LLP

(57) ABSTRACT

Resonance scattering analysis of at least 3-component (3-C) VSP data detects heterogeneities in the proximity of a borehole. A method for seismic exploration of a pre-determined volume of the earth for assessing features of the volume using at least 3-C VSP data generated for the volume comprises: computing a resonance spectra indicating resonance scattering of the at least 3-C VSP data; and determining a lateral continuity of said features in accordance with the resonance spectra. Zero amplitude in a resonance spectrum indicates definite polarization of the direct pressure wave into the ray direction and very weak lateral heterogeneity along the path of the direct wave. High amplitudes in a resonance spectrum are observed if energy of the direct wave is observed on the horizontal components due to scattering at small-scale lateral heterogeneities near the receiver. Peak frequency provides information on the size and location of the scattering structure.

18 Claims, 5 Drawing Sheets

OTHER PUBLICATIONS

Levander, Alan. "Seismic Scattering Near the Earth's Surface." PAGEOPH, vol. 132, Nos. 1/2, 1990.*

Mateeva, Albert. "Distortions in VSP spectral ratios caused by thin horizontal layering." 2003 CWP Project Review Report.*

Mateeva, Albert. "Quantifying the uncertainties in absorption estimates from VSP spectral ratios." 2003 CWP Project Review Report.*

Pyrak-Nolte, Laura. "Seismic imaging of Fractured Media." Proc. $5^{th}$ International Workshop on the Application of Geophysics in Rock Engineering, Jul. 7, 2002.*

* cited by examiner

RESONANCE SCATTERING SEISMIC METHOD

RELATED APPLICATION

This application claims priority under 35 U.S.C. 119(e) from U.S. Provisional Application Ser. No. 60/514,134 filed Oct. 24, 2003, which application is incorporated herein by reference.

TECHNICAL FIELD

This application relates to the general field of seismic exploration and, more particularly, to methods and apparatus for the exploration and production of oil, gas, minerals and other commodities; the detection of cavities, tunnels and faults for geotechnical, environmental and engineering studies.

BACKGROUND

The need to develop efficient and robust seismic techniques for the assessment of lateral continuity (scale parameters) in the layered, heterogeneous media surrounding boreholes has long been recognized. Information about lateral continuity is assistive in planning the extraction of oil, gas, minerals, and other commodities from the area surrounding a borehole, and in the detection of cavities, tunnels and faults for geotechnical, environmental and engineering studies.

FIG. 1 shows three subsurface models and illustrates the problem of assessing lateral continuity in the immediate vicinity of an exploration well (Halderson and Golf-Racht, 1992). The three different subsurface models yield the same results when the vertical scale is assessed. The vertical scale may be observed using conventional techniques such as core sampling and borehole logs. However, the subsurface models differ significantly as far as lateral continuity of lithological units are concerned (horizontal scale length).

Resolution is the ability to distinguish separate features. Resolution is related to the minimum distance between 2 features that is required so that the features may be defined separately and not as one. The lateral resolution of conventional seismic methods for assessing lateral continuity is limited by the Fresnel Zone radius of the transmitted seismic wavefield. For techniques that use a surface seismic wavefield source, the result is that the minimum size of heterogeneities (e.g. oil reservoirs) that can be resolved increases with the depth of the exploration target being examined.

Well logs are physical measurements as a function of depth in a borehole. Examples include logs that record electrical, acoustic, nuclear and geotechnical measurements. These logs provide information about the formation probed by the borehole, commonly in the cm to dm range. However, it is impractical to drill sufficient boreholes to achieve resolutions in this range over the entire site to be explored.

Common techniques to assess lateral continuity of subsurface formations are 2D and 3D surface seismic methods, offset Vertical Seismic Profiling ("VSP") techniques and cross-well seismic methods.

Surface seismic exploration methods are based on energy traveling from seismic sources (located at or near the earth's surface) down to where physical rock properties (density, compressional and shear modulus) change. There a portion of the seismic energy is reflected back to the surface where it is detected by sensors. Horizontal resolution in such surface seismic methods is governed by the Fresnel Zone, the portion of a horizontal reflector at a depth from which the reflected energy can reach a sensor within one-half wavelength of the first reflected energy. The width of the Fresnel Zone increases with the increasing depth of the reflector, thus limiting the lateral resolution of surface seismic methods.

Another way to look at the side of a borehole is offset VSP and walk away VSP techniques (using sensors in the borehole and surface seismic sources). Lateral resolution is limited by the width of the Fresnel Zone and limited azimuthal coverage by the surface seismic sources. VSP techniques rely on the separation of down-going and up-going wavefields recorded in the borehole.

Cross-well seismic methods investigate the region between two boreholes (sources are located in one borehole and receivers are located in the other borehole). This method overcomes limitations imposed by surface seismic sources; however, information about the lateral continuity of a formation is restricted to the plane between the boreholes. In addition, this method requires two or more boreholes.

A solution which addresses some or all of these needs or drawbacks is therefore desired.

SUMMARY

Surface seismic methods are employed to image subsurface structures for hydrocarbon and mineral exploration in two and three dimensions. Boreholes and well logs provide key information about the vertical distribution of geological and petrophysical data. As lateral resolution of surface seismic data decreases with increasing depth of investigation, borehole based seismic techniques such as offset VSP and cross-well surveys must be employed to assess lateral continuity of formations, reservoir and target zones of interest. Resonance scattering analysis of 3-component ("3-C") VSP data, that is data from which 3 mutually orthogonal components can be extracted, offers an opportunity to detect heterogeneities in the proximity of the borehole, thereby closing the existing "resolution gap" between surface seismic methods (hundred(s) of meters), and conventional well logs (decimeter resolution).

Resonance scattering analysis, in accordance with embodiments of the invention, of 3-C VSP data offers an opportunity to detect heterogeneities in the proximity of the borehole, thereby closing the existing "resolution gap" between surface seismic methods (hundred(s) of meters), and conventional well logs (decimeter resolution). A resonance spectrum for 3-C VSP data may be computed as follows: at each depth interval the 3-C VSP data are rotated into the ray coordinate system, so that one component (a radial component) points into the direction of the incident pressure wave. The first arrival is windowed and the same time window is applied to the 3 components. A resonance spectrum is obtained by dividing the amplitude spectra of the transverse component and the radial component at each depth interval. The same procedure can be applied to the direct shear wave.

Zero amplitude in a resonance spectrum indicates definite polarization of the direct pressure wave into the ray direction which is expected for very weak lateral heterogeneity along the path of the direct wave. High amplitudes in a resonance spectrum, however, are observed if energy of the direct wave is observed on the horizontal components due to scattering at small-scale lateral heterogeneities near the receiver. The peak frequency provides information on the size and location of the scattering structure.

Conventional VSP, offset VSP and walk away VSP processing techniques are based on separating up- and down-going wavefields. This approach requires densely sampled wavefields as a function of depth (in order to avoid spatial aliasing). In contrast, resonance scattering analysis of 3-C VSP data can be restricted to depth levels of interests or even sparsely sampled data. In addition, resonance scattering analysis of 3-C VSP data provides information about heterogeneities located in the in-line and cross-line direction while reflection sections derived from offset VSP and walk away VSP data are restricted to the inline direction.

BRIEF DESCRIPTION OF THE DRAWINGS

In order that the embodiments of the invention may be readily understood, embodiments of the invention are illustrated by way of examples in the accompanying drawings, in which.

It will be noted that throughout the appended drawings, like features are identified by like reference numerals.

DETAILED DESCRIPTION

When conducting exploration in accordance with seismic methods, reservoir zones are often characterized by strong perturbations in elastic parameters, in particular compressional wave velocities. Lateral variations of compressional and shear wave velocities may be determined in the forward scattering (transmission) direction using 3-C VSP data acquisition geometry. Such an analysis of the transmitted seismic wavefield helps to assess how well log data relate to the surrounding reservoir zone.

As will be understood to persons of ordinary skill in the art, the effects of heterogeneities on seismic wave propagation can be described in terms of different propagation regimes (Wu, 1989): quasi-homogeneous for heterogeneities too small to be seen by seismic waves, Rayleigh scattering, Mie scattering and small-angle scattering. These scattering regimes cause characteristic amplitude, phase and travel time fluctuation, which can be used to obtain estimates of scale length and thereby assess lateral continuity of lithological units and structure in the immediate vicinity of boreholes.

Horizontal resolution of exploration seismic data is often discussed in terms of the Fresnel Zone. For surface and VSP data, the Fresnel Zone radius increases with increasing depth of investigation. The lateral resolution scale obtained from resonance scattering in accordance with embodiments of the present invention, however, is limited only by the effective frequency content of the seismic signal.

Figure 1:
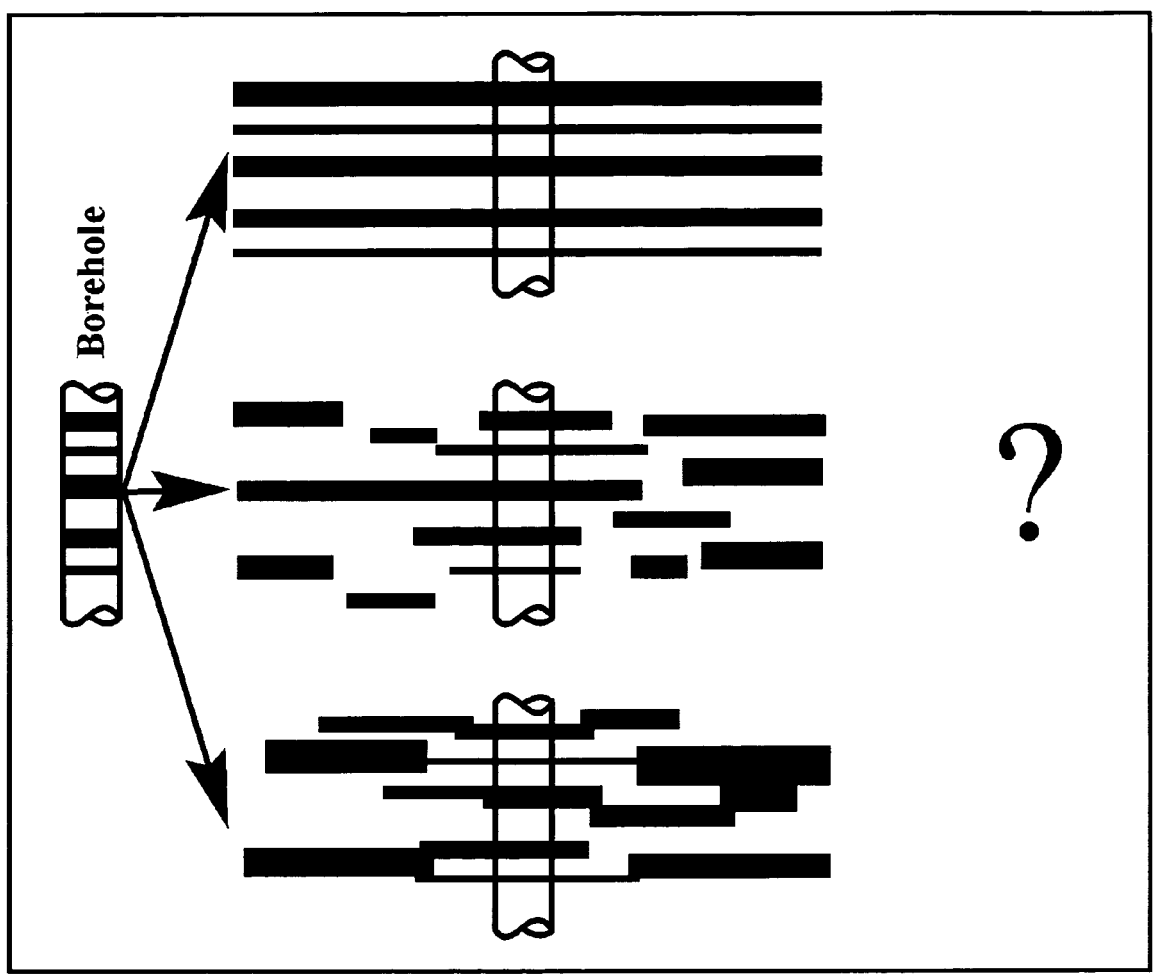
FIG. 1 illustrates various possible lateral continuities in the vicinity of an exemplary exploration borehole in accordance with the prior art.
Figure 2:
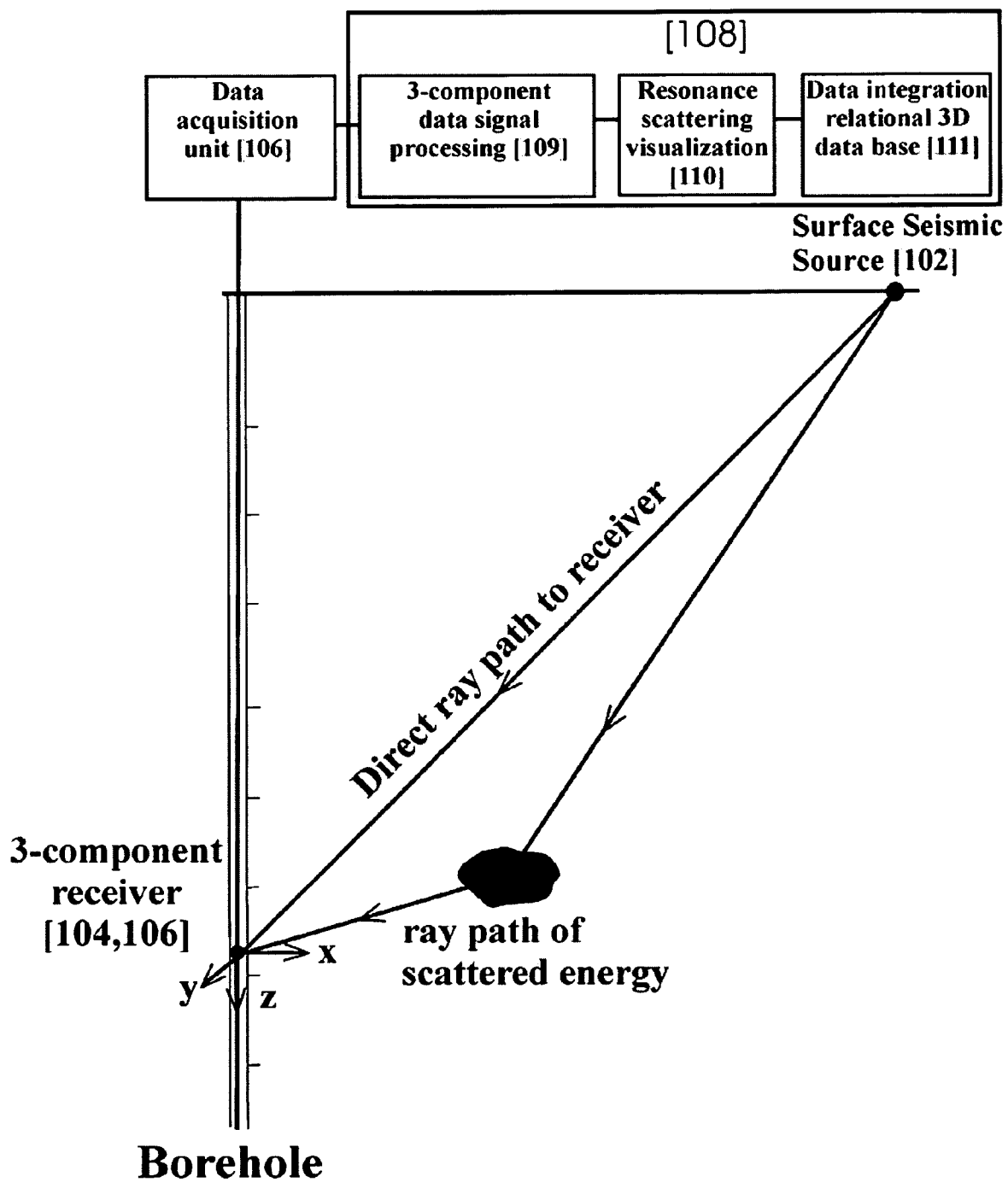
FIG. 2 illustrates a schematic diagram of an exemplary apparatus useful for performing the process according to embodiments of the invention.

In accordance with the operation of embodiments of the invention in an exemplary embodiment depicted in FIG. 2, seismic sources at the surface generate seismic energy (compressional and shear wave energy). Part of the seismic energy propagates through the earth to a 3-C receiver in a borehole (i.e. along a direct path) and part of the energy encounters a small-scale heterogeneity in the proximity of the borehole. As such, scattered energy also propagates to and will be recorded at the 3-C receiver.

Thus, FIG. 2 illustrates schematically and on location at a volume of earth to be seismically explored an exemplary system 100 adapted for performance in accordance with a method aspect of embodiments of the present invention. System 100 comprises seismic sources 102, sensors 104, data acquisition equipment 106 and a data processing system 108.

Seismic sources 102 may comprise any broadband controlled (repeatable) sources such as vibroseis, explosives, airguns and water guns, sparker, weight-drop, etc. Seismic sources 102 may be located at or beneath the surface of the earth in the region of the volume of the earth to be explored. In some embodiments, sensors 104 comprise 3-C geophones or accelerometers. It is noted that omni-directional sensors such as hydrophones (detectors sensitive to pressure changes) are not generally suitable to produce 3-C signal data. Sensors may be positioned in the borehole in accordance with known techniques for gathering 3-C VSP data. Single 3-C receivers or multiple 3-C receiver arrays may be used. The resonance scattering technique in accordance with embodiments of the present invention is suitable for zero-offset VSPs, walk-away VSPs, azimuthal VSPs and walk above VSPs in vertical or deviated boreholes. As such the seismic sources 102 and sensors 104 may be positioned accordingly.

Data acquisition equipment 106 may comprise amplifiers, filters, analog to digital signal conversion and seismic data recording equipment for measurement of elastic waves (compressional and shear waves) excited by broadband seismic sources 102 at or beneath the surface with single- or multilevel 3-C sensors 104 as described above. 3-C sensors [104] and data acquisition equipment [106] may be separated by wireline or may be collocated. The resonance scattering technique typically uses full waveform seismic data (including direct (down going), reflected (up going) and scattered arrivals). Thus true amplitude 3-C recordings are utilized. Data acquisition equipment 106 records the signal data it acquires to a computer readable medium such as disk, tape or other device (not shown).

Data processing system 108 may comprise a microcomputer programmed in accordance with method aspects of embodiments of the invention to perform resonance scattering processing operations. Data processing system 108 comprises, in this exemplary embodiment, at least one processor 109 adapted for 3-C data signal processing in accordance with a method described further herein with reference to FIG. 3, such as by software programming or other configuration techniques; one or more resonance scattering visualization devices 110 (such as a display screen and/or printer); and a data integration sub-system 111 including a relational data base with complimentary information. Data processing system 108 typically includes one or more input devices such as a pointing device, keyboard or other device for interacting with the system 108 (all not shown). Data system 108 may be coupled to data acquisition equipment 106 as per FIG. 2 for directly receiving acquired signal data from this equipment 106 or may receive it through other means such as via recorded media or a network (all not shown). Many alternate embodiments of data processing system 108 may be used. While the data processing system 108 is shown including data integration sub-system 111, persons skilled in the art will appreciate that such a sub-system 111 may be remotely located and coupled via a network or other connection. Further, various display or other visualization devices may be used or coupled remotely to system 108. System 108 (i.e. processor 109) may produce resonance scattering analysis data for visualisation on a visualisation device coupled to a different data processing system (not shown).

Signal processing (for example, by data acquisition equipment 106) in some embodiments comprises adaptive noise removal and instrument response de-convolution. The resonance scattering technique of the embodiments of the present invention works well when applied to raw (unconditioned) 3-C seismic data; however, some seismic data processing techniques that are commonly applied to raw data before it is examined may adversely affect this resonance scattering method. Therefore it is desirable that Wiener filters (spike and predictive convolution techniques) and conventional VSP wavefield separation techniques are not applied to the signals for resonance scattering analysis.

Figure 3:
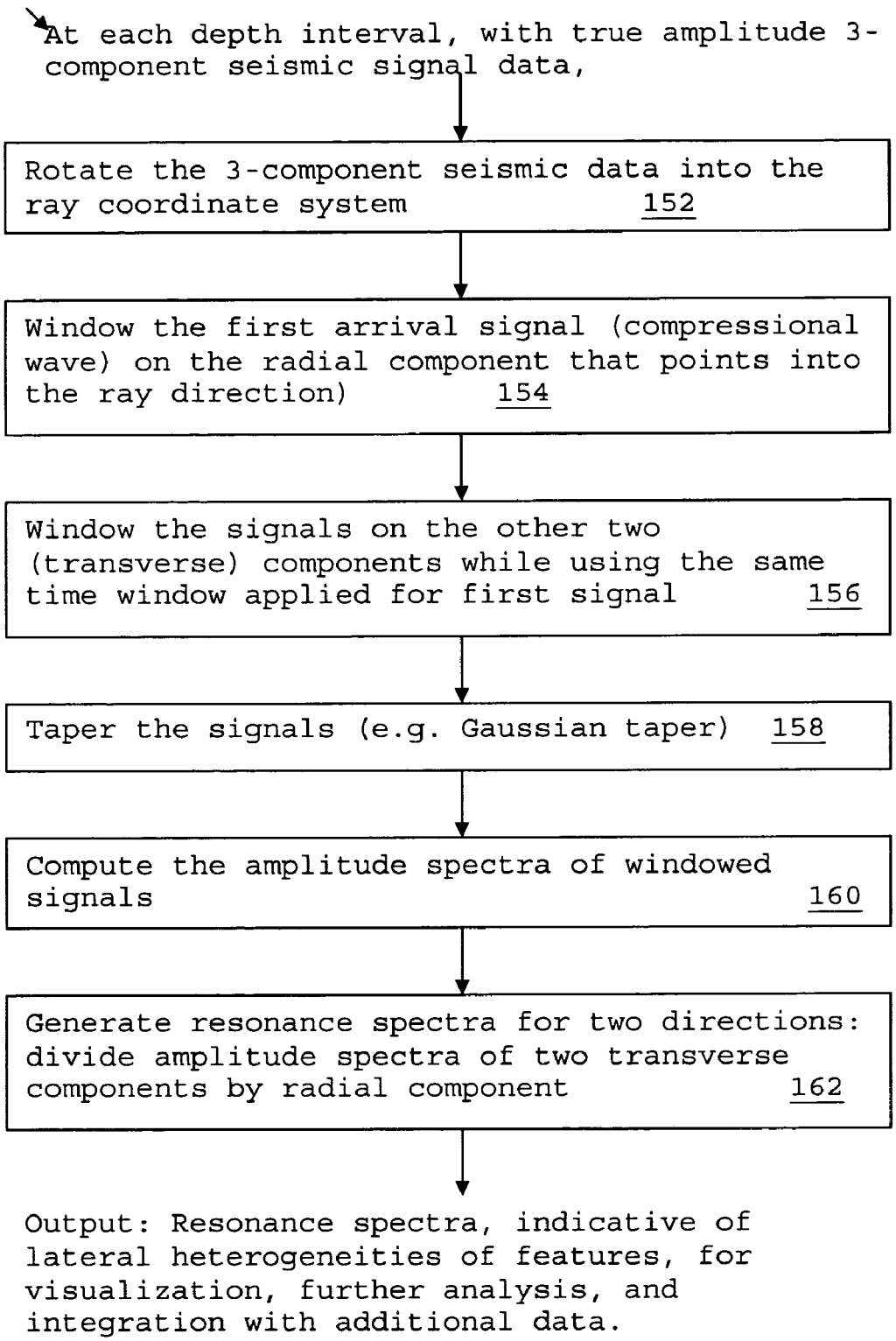
FIG. 3 illustrates a flow chart of operations for an exemplary embodiment of the invention.

Referring now to FIG. 3 there is shown a flow chart of operations 150 for an exemplary embodiment of a method aspect of the present invention. Such operations may be performed by a computer programmed in accordance with programming techniques known to those of ordinary skill in the art to implement the embodiments of the present invention as described herein above.

For each depth interval of interest and availability in a set of true amplitude 3-C VSP data, at step 152, the 3-C VSP data is rotated into the ray coordinate system. One component of the three, the ray component, is rotated to point into the direction of the incident pressure wave.

Windowing of the first arrival signal (compressional wave) is performed on the radial component (that is, the component that points in the direction of the ray) (step 154).

At step 156, further windowing is performed for the signals on the other two (i.e. transverse) directional components while using the same time window applied to the first (radial) component. The signals thus share a time component but have respective transverse directional components.

At step 158, a tapering of signals may be performed in order to prevent discontinuities at the edges of the window. Tapering may be performed in accordance with Gaussian taper techniques.

Amplitude spectra for each of the 3-C VSP data is computed (step 160) such as by the use of a fast Fourier transform. At step 162, resonance spectra for the two transverse directions are obtained by dividing respectively the two transverse amplitude spectra components by the radial amplitude spectra component.

The operations 150 are repeated in accordance with the various time/depth parameters of the signal data captured to create a multidimensional map of resonance spectra for the volume of earth that is the subject of the seismic exploration.

Resonance spectra obtained at step 162 characterises lateral heterogeneity in the vicinity of the sensors. Resonance spectra obtained from the two transverse components detect small scale heterogeneities in the proximity of the borehole. Signal processing as described in steps 152 to 162 for first arrival compressional waves may also be applied to first arrival shear waves.

Resonance spectra from the map of such generated data may then be integrated with well log, petrophysical and other seismic data using, for example, data integration sub-system 111 to build an enhanced three dimensional geological computerized model around the borehole in accordance with data integration techniques known to those skilled in the art. Data generated in accordance with the resonance scattering method described herein may be used to enhance the accuracy and/or scope of these models and the charts, graphs, tables, and other visualisations that may be generated therefrom. In accordance with known techniques, the resonance scattering data may be displayed for further analysis and interpretation. The data may be displayed in various horizontal and vertical time and depth slices.

The size of a heterogeneity detected may be determined by dividing an estimated velocity of the seismic wave used to generate the seismic data by the peak frequency of the amplitude spectra. Velocity may be estimated using known techniques and knowledge of the medium being explored. Further, proximity of a heterogeneity may be determined using a wavelength of the peak frequency of the amplitude spectra. The heterogeneity will typically be within a distance less than 2 to 3 times the length of wavelength. This is a reasonable assumption due to the rate at which a scattered wave decays with distance. Direction is easily determined using the known location of the sensor and the seismic source.

Figure 4:
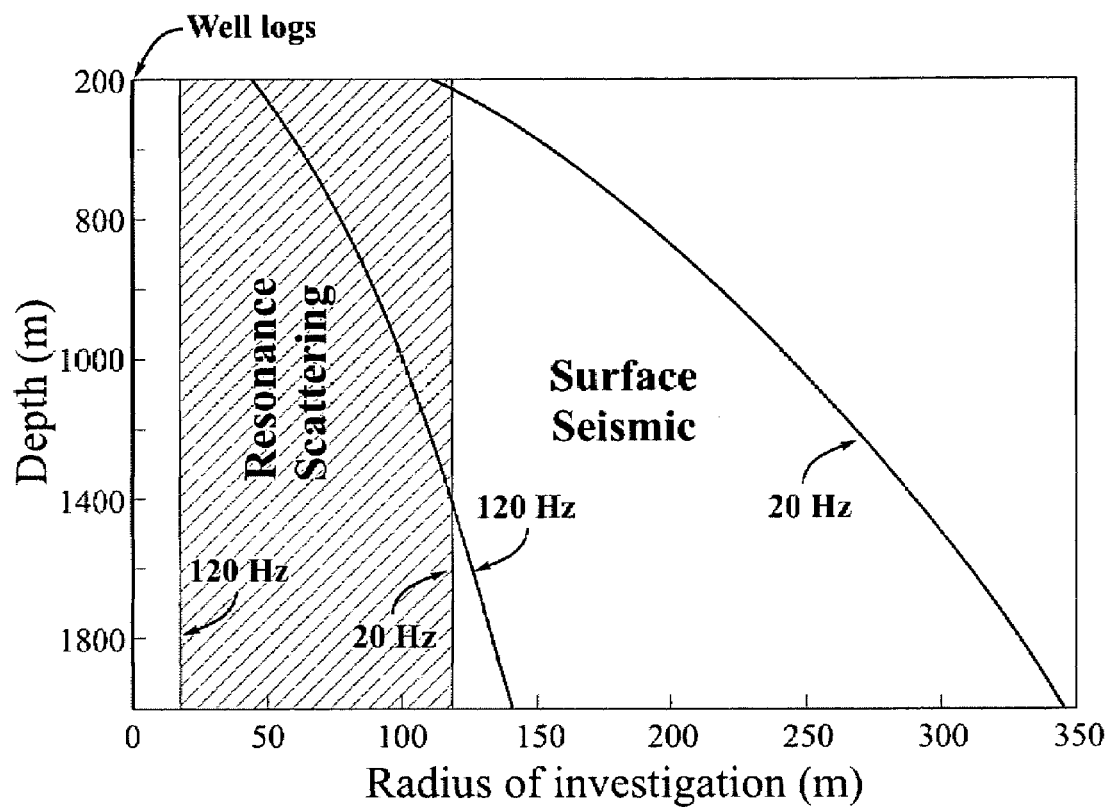
FIG. 4 is a graph of a lateral resolution as defined by Fresnel Zone radius for surface source and resonance scattering as observed by receivers in VSP geometry.

As noted previously, in contrast to prior art techniques, the lateral resolution scale obtained for resonance scattering is limited only by the effective frequency content of the seismic signal and not in terms of the Fresnel Zone radius. FIG. 4 shows the lateral resolution for resonance scattering (obtained from forward scattered wavefield data) and radius of Fresnel zone for surface sources having model parameters: V=2400 m/s, fmin=20 Hz and fmax=120 Hz. For surface seismic sources, the radius of the Fresnel zone increases with increasing depth of investigation. In contrast, the radius of investigation for resonance scattering analysis is controlled by the effective bandwidth of the seismic signal and remains constant at depth. Thereby resonance scattering analysis closes the resolution gap between conventional well logs (decimetre resolution) and surface seismic methods (hundred(s) of meters).

Figure 5C:
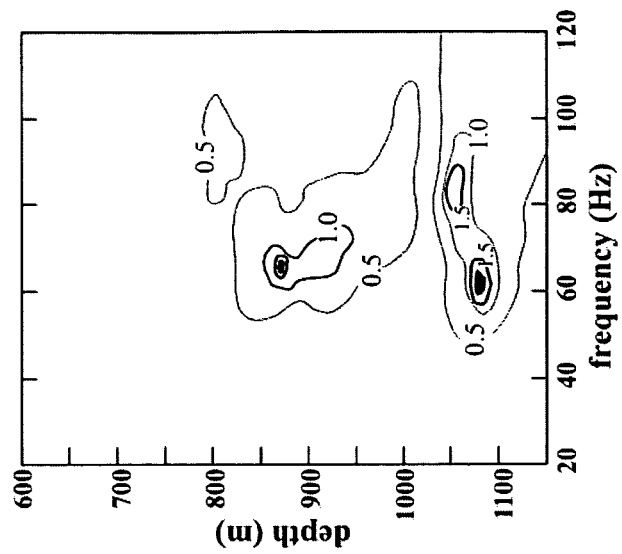
FIGS. 5A, 5B and 5C show resonance spectra amplitude for reservoir models with different lateral scale length.
Figure 5B:
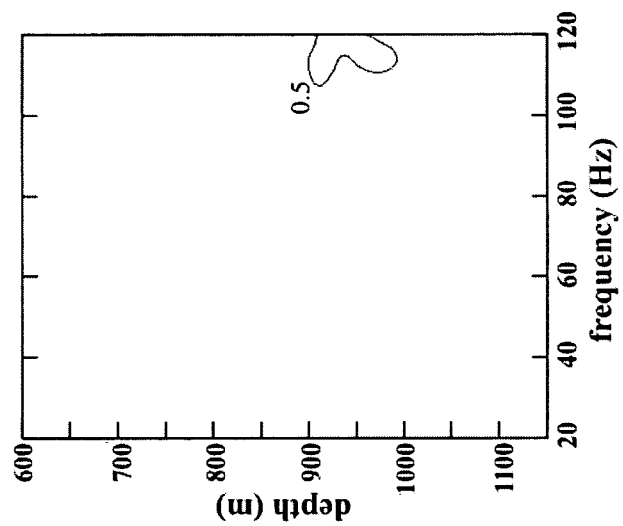
Figure 5A:
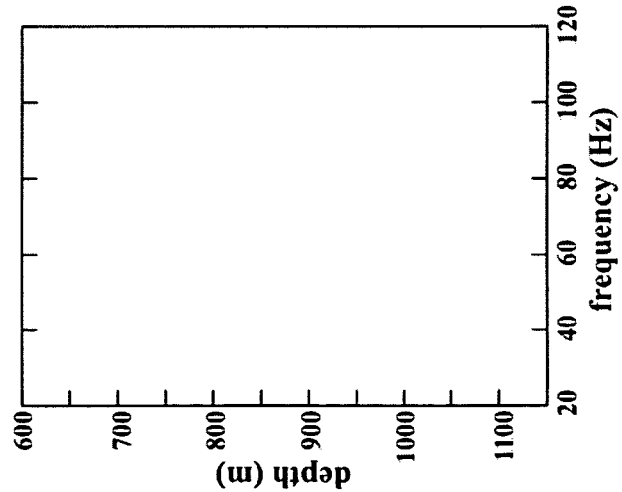

FIGS. 5A, 5B and 5C show resonance spectra for three synthetic reservoir models. The spectra are computed for seismic frequencies from 20 to 120 Hz. The vertical scale length for all models is 50 m and the models can be tied to an existing borehole log; the horizontal scale of the reservoir model has a correlation length of 2000 m (FIG. 5A), 500 m (FIG. 5B) and 50 m (FIG. 5C). As expected, seismic waveform data for models with large horizontal scale length show no evidence of resonance scattering (FIG. 5A, 5B). For short wavelength horizontal scales lengths, prominent resonance peaks are observed in the resonance spectra (FIG. 5C).

Resonance scattering analysis of 3-C VSP data detects evidence for local anomalous physical properties in proximity of the borehole. Although well suited to hydrocarbon and mineral exploration, this borehole seismic technique is readily adaptable to geotechnical and environmental problems such as detection of local cavities, faults or fractures, heterogeneities in foundations and tunnels. This is a fundamental consequence of the underlying physics of this method, which ultimately rests on local contrasts in physical material properties (such as densities, compressional modulus or shear modulus).

Although the above description relates to specific embodiments as presently contemplated by the inventors, it is understood that the inventive subject matter in its broad aspect includes mechanical and functional equivalents of the elements described herein. The embodiment(s) of the invention described above is(are) intended to be exemplary only. The scope of the invention is therefore intended to be limited solely by the scope of the appended claims.

What is claimed is:

1. A method for use with a data processing system, for seismically assessing features of a volume of the earth using at least 3-component (3-C) Vertical Seismic Profiling (VSP) data, the method comprising:

acquiring from at least one predetermined position within a volume of earth a set of at least 3-C VSP data representing effects of a seismic event occurring within the region of said volume, the VSP data characterized by at least time, position, and amplitude;

computing at least one resonance spectrum indicating resonance scattering of the at least 3-C VSP data, said computing comprising dividing a plurality of transverse amplitude spectra components by a radial amplitude spectra component;

using a processor to process the VSP data to interpret a lateral discontinuity of said features in accordance with the at least one resonance spectrum, and causing data related to the interpretation of the lateral discontinuity to be displayed on a computer interface screen in human interpretable form.

2. The method of claim 1 comprising, prior to computing the at least one spectrum, transforming the at least 3-C VSP data into a predetermined directional coordinate system.

3. The method of claim 1 comprising, prior to computing the at least one spectrum, windowing the at least 3-C VSP data in accordance with a common time characteristic to generate windowed data; and wherein said computing at least one spectrum uses said windowed data.

4. The method of claim 3 comprising, prior to said step of computing at least one spectrum, tapering said windowed data.

5. The method of claim 1 comprising providing a human-interpretable visual display representing said at least one spectrum.

6. The method of claim 1 comprising associating said at least one spectrum with additional exploration data generated for said volume of earth, said exploration data selected from the group of data comprising well log data, petrophysical data and seismic data.

7. The method of claim 1 wherein step of acquiring comprises reading said at least 3-C VSP data from a computer readable medium carrying said at least 3-C VSP data.

8. The method of claim 1, wherein the seismic event is caused by a controlled seismic source.

9. The method of claim 1 wherein said interpreting comprises determining a size of a detected lateral heterogeneity in accordance with an estimated velocity of a seismic wave used to generate the at least 3-C VSP data and a peak frequency of at least one amplitude spectrum.

10. The method of claim 1 wherein said interpreting comprises determining a proximity of a detected heterogeneity using a wavelength of a peak frequency of at least one amplitude spectrum.

11. The method of claim 9 wherein the triggered seismic event used to generate the at least 3-C VSP data is produced by a broadband controlled seismic source.

12. The method of claim 11 wherein said broadband controlled seismic source is selected from the group of sources comprising vibroseis, explosives, airguns, water guns, sparker, and weight drop.

13. A method for use with a data processing system, for seismically assessing features of a volume of the earth using at least 3-component (3-C) Vertical Seismic Profiling (VSP) data, the method comprising:

accessing stored data previously acquired from at least one predetermined position within a volume of earth, the data comprising at least 3-C VSP data representing effects of a seismic event occurring within the region of said volume, the VSP data characterized by at least time, position, and amplitude;

computing at least one resonance spectrum indicating resonance scattering of the at least 3-C VSP data, said computing comprising dividing a plurality of transverse amplitude spectra components by a radial amplitude spectra component; and using a processor to process the VSP data to interpret a lateral discontinuity of said features in accordance with the at least one resonance spectrum, and causing data related to the interpretation of the lateral discontinuity to stored at least temporarily in computer-readable media.

14. The method of claim 13, wherein the data is acquired from at least two predetermined positions within the region of said volume, the method comprising:

for data acquired at each predetermined position, computing an amplitude spectrum for at least three components of the at least 3-C VSP data in accordance with a common time characteristic.

15. The method of claim 14, wherein the data is acquired from positions at at least two depths within said borehole, the method comprising:

for data acquired at each depth, computing an amplitude spectrum for at least three components of the at least 3-C VSP data in accordance with a common time characteristic.

16. The method of claim 13, wherein the predetermined position is located within a borehole.

17. The method of claim 13, wherein the seismic event is caused by a controlled seismic source.

18. A method for use with a data processing system, for seismically assessing features of a volume of earth using at least 3-component (3-C) Vertical Seismic Profiling (VSP) data, the method comprising:

acquiring from at least one predetermined position within a volume of earth a set of at least 3-C VSP data representing effects of a seismic event occurring within the region of said volume, the VSP data characterized by at least time, position, and amplitude;

computing at least one resonance spectrum indicating resonance scattering of the at least 3-C VSP data, said computing comprising dividing a plurality of transverse amplitude spectra components by a radial amplitude spectra component;

using a processor to process the VSP data to interpret a lateral discontinuity of said features in accordance with the at least one resonance spectrum, and causing data related to the interpretation of the lateral discontinuity to be stored at least temporarily in computer-readable media.

* * * * *